US008679589B2

(12) United States Patent
Groenewolt et al.

(10) Patent No.: US 8,679,589 B2
(45) Date of Patent: Mar. 25, 2014

(54) COATING AGENT HAVING HIGH SCRATCH RESISTANCE AND HIGH WEATHERING RESISTANCE

(75) Inventors: Matthijs Groenewolt, Münster (DE); Günter Klein, Münster (DE); Andreas Poppe, Shanghai (CN); Simone Hesener, Münster (DE); Wilfried Stübbe, Greven (DE); Manuela Niemeier, Drensteinfurt (DE); Sabine Holtschulte, Ascheberg (DE); Oliver Hilge, Drensteinfurt (DE); Björn Feldmann, Münster (DE)

(73) Assignee: BASF Coatings GmbH, Munster (DE)

( * ) Notice: Subject to any disclaimer, the term of this patent is extended or adjusted under 35 U.S.C. 154(b) by 149 days.

(21) Appl. No.: 12/808,973

(22) PCT Filed: Dec. 18, 2008

(86) PCT No.: PCT/EP2008/010809
§ 371 (c)(1),
(2), (4) Date: Sep. 8, 2010

(87) PCT Pub. No.: WO2009/077181
PCT Pub. Date: Jun. 25, 2009

(65) Prior Publication Data
US 2011/0027489 A1 Feb. 3, 2011

(30) Foreign Application Priority Data

Dec. 19, 2007 (DE) .................... 10 2007 061 856

(51) Int. Cl.
*B05D 3/02* (2006.01)
(52) U.S. Cl.
USPC ........ 427/387; 427/402; 427/407.1; 524/588; 524/589; 524/590; 525/453; 528/28
(58) Field of Classification Search
None
See application file for complete search history.

(56) References Cited

U.S. PATENT DOCUMENTS

| | | | |
|---|---|---|---|
| 3,168,483 A | 2/1965 | Beitchman et al. | |
| 3,707,521 A | 12/1972 | Santis | |
| 3,718,614 A | 2/1973 | Smyth | |
| 3,959,403 A | 5/1976 | LaRochelle | |
| 4,278,783 A * | 7/1981 | Taniyama et al. | 528/23 |
| 4,479,990 A | 10/1984 | Dixon et al. | |
| 4,499,150 A | 2/1985 | Dowbenko et al. | |
| 4,499,151 A | 2/1985 | Dowbenko et al. | |
| 4,598,131 A | 7/1986 | Prucnal | |
| 4,710,542 A | 12/1987 | Forgione et al. | |
| 4,853,146 A | 8/1989 | Rorig et al. | |
| 5,041,239 A | 8/1991 | Rorig et al. | |
| 5,225,248 A | 7/1993 | Stephenson | |
| 5,238,993 A | 8/1993 | Hsieh | |
| 5,250,605 A | 10/1993 | Hazan et al. | |
| 5,516,559 A | 5/1996 | Rockrath et al. | |
| 5,691,439 A | 11/1997 | Slack et al. | |
| 5,716,678 A | 2/1998 | Rockrath et al. | |
| 5,719,251 A | 2/1998 | Wilczek et al. | |
| 5,747,166 A | 5/1998 | Schwarte et al. | |
| 5,747,590 A | 5/1998 | Corcoran et al. | |
| 5,908,895 A | 6/1999 | Vogt-Birnbrich et al. | |
| 5,985,463 A | 11/1999 | Lin et al. | |
| 6,379,807 B1 | 4/2002 | Nordstrom et al. | |
| 6,403,699 B1 | 6/2002 | Rockrath et al. | |
| 6,492,482 B2 | 12/2002 | Lomoelder et al. | |
| 6,607,833 B1 | 8/2003 | Uhlianuk et al. | |
| 7,772,320 B2 | 8/2010 | Poppe et al. | |
| 7,858,732 B2 | 12/2010 | Bruchmann et al. | |
| 8,013,099 B2 | 9/2011 | Poppe et al. | |
| 2002/0142169 A1 | 10/2002 | Hofacker et al. | |
| 2003/0027921 A1 | 2/2003 | Speier et al. | |
| 2004/0106726 A1 | 6/2004 | Joshi et al. | |
| 2005/0165177 A1 | 7/2005 | Wagner et al. | |
| 2005/0238899 A1 * | 10/2005 | Nagata et al. | 428/480 |
| 2006/0045965 A1 * | 3/2006 | Lin | 427/162 |
| 2006/0217472 A1 | 9/2006 | Staunton | |
| 2007/0059532 A1 | 3/2007 | Ramesh et al. | |
| 2007/0213501 A1 | 9/2007 | Bruchmann et al. | |
| 2008/0047469 A1 | 2/2008 | Poppe et al. | |
| 2008/0075871 A1 * | 3/2008 | Ambrose et al. | 427/387 |
| 2008/0245999 A1 | 10/2008 | Poppe et al. | |
| 2009/0223631 A1 | 9/2009 | Poppe et al. | |
| 2009/0275680 A1 | 11/2009 | Bruchmann et al. | |
| 2009/0281271 A1 | 11/2009 | Bruchmann et al. | |
| 2010/0015344 A1 | 1/2010 | Groenewolt et al. | |
| 2010/0028544 A1 | 2/2010 | Groenewolt et al. | |
| 2010/0143596 A1 | 6/2010 | Groenewolt et al. | |
| 2011/0045190 A1 | 2/2011 | Groenewolt et al. | |
| 2011/0059251 A1 | 3/2011 | Poppe et al. | |
| 2011/0245406 A1 | 10/2011 | Klein et al. | |
| 2011/0263789 A1 | 10/2011 | Taniguchi et al. | |
| 2011/0269897 A1 | 11/2011 | Groenewolt et al. | |
| 2012/0100380 A1 | 4/2012 | Groenewolt | |
| 2012/0189858 A1 | 7/2012 | Poppe et al. | |

FOREIGN PATENT DOCUMENTS

| | | | |
|---|---|---|---|
| DE | 4132430 A1 | 4/1993 | |
| DE | 10103027 A1 | 7/2002 | |

(Continued)

OTHER PUBLICATIONS

International Search Report of International application No. PCT/EP2008/010809 dated May 8, 2009.

(Continued)

*Primary Examiner* — Erma Cameron
(74) *Attorney, Agent, or Firm* — Cantor Colburn LLP

(57) ABSTRACT

The present invention relates to a coating composition comprising
(a) at least one hydroxyl-containing compound (A),
(b) at least one compound (B) having free and/or blocked isocyanate groups, and
(c) at least one catalyst (C) for the crosslinking of silane groups,
one or more constituents of the coating composition containing hydrolyzable silane groups, wherein the coating composition contains a water scavenger as further constituent (D).

13 Claims, No Drawings

(56) References Cited

FOREIGN PATENT DOCUMENTS

| | | |
|---|---|---|
| DE | 69625241 T2 | 9/2003 |
| DE | 102004050746 A1 | 4/2006 |
| DE | 60116825 T2 | 7/2006 |
| DE | 102005003299 A1 | 7/2006 |
| DE | 102005045228 A1 | 4/2007 |
| DE | 102006024823 A1 | 12/2007 |
| DE | 102007013242 A1 | 9/2008 |
| DE | 102007026722 A1 | 12/2008 |
| DE | 102007061855 A1 | 6/2009 |
| DE | 102008060454 A1 | 6/2010 |
| EP | 0008127 A1 | 2/1980 |
| EP | 0245700 A2 | 11/1987 |
| EP | 0249201 A2 | 12/1987 |
| EP | 0276501 A2 | 8/1988 |
| EP | 0554684 A1 | 8/1993 |
| EP | 0571073 A2 | 11/1993 |
| EP | 0626888 B1 | 12/1994 |
| EP | 0692007 B1 | 1/1996 |
| EP | 0949308 A1 | 10/1999 |
| EP | 0994117 A1 | 4/2000 |
| EP | 1193278 A1 | 4/2002 |
| EP | 1273640 A2 | 1/2003 |
| EP | 1334989 A2 | 8/2003 |
| EP | 0991690 B1 | 8/2004 |
| EP | 1502927 A1 | 2/2005 |
| EP | 2102263 B1 | 9/2009 |
| JP | H05194880 A | 8/1993 |
| JP | H05239178 A | 9/1993 |
| JP | 10306251 A | 11/1998 |
| JP | H11116847 A | 4/1999 |
| JP | H07331136 A | 12/2005 |
| WO | WO9422968 A1 | 10/1994 |
| WO | WO9712945 A1 | 4/1997 |
| WO | WO0055229 A1 | 9/2000 |
| WO | WO0109260 A1 | 2/2001 |
| WO | WO0198393 A1 | 12/2001 |
| WO | WO03093343 A1 | 11/2003 |
| WO | WO2004014991 A1 | 2/2004 |
| WO | WO2004046218 A1 | 6/2004 |
| WO | WO2004104078 A1 | 12/2004 |
| WO | WO2005003340 A2 | 1/2005 |
| WO | WO2005012382 A1 | 2/2005 |
| WO | WO2005033240 A1 | 4/2005 |
| WO | WO2005090500 A1 | 9/2005 |
| WO | WO2005118677 A1 | 12/2005 |
| WO | WO2006042584 A1 | 4/2006 |
| WO | WO2006042585 A1 | 4/2006 |
| WO | WO2006042658 A1 | 4/2006 |
| WO | WO2006099054 A2 | 9/2006 |
| WO | WO2006131314 A1 | 12/2006 |
| WO | WO2007003826 A2 | 1/2007 |
| WO | WO2007003857 A3 | 1/2007 |
| WO | WO2007016234 A2 | 2/2007 |
| WO | WO2007033786 A1 | 3/2007 |
| WO | WO2007137632 A1 | 12/2007 |
| WO | WO2008074489 A1 | 6/2008 |
| WO | WO2008074490 A1 | 6/2008 |
| WO | WO2008074491 A1 | 6/2008 |
| WO | WO2008110230 A1 | 9/2008 |

OTHER PUBLICATIONS

Written Opinion for International application No. PCT/EP2008/010809 dated May 8, 2009.
International Preliminary Report on Patentability for International application No. PCT/EP2008/010809 dated Jul. 20, 2010.
A. Albert, et al.; "Determination of Ionization Constants by Potentiometrictitration Using a Glass Electrode"The Determination of Ionization Constants, A Laboratory Manual, Third Edition; Chapman and Hall, London, NY (1984); pp. 14-38.
Industrial Coatings Technical Data Sheet, Basonat HI 190 B/S, BASF The Chemical Company, Dec. 2010, 3 pages.
Machine Translation into English of EP1334989A2, Aug. 2003.
"Dissociation Constants in Water" (Titration Method—Spectrophotometric Method—Conductometric Method); OECD Guideline for Testing of Chemicals, 112; May 12, 1981; pp. 1-7.
Opposition to EP 2 102 263 B1, Title: "Coating Agents Having High Scratch Resistance And Weathering Stability", Patentee: BASF Coatings GmbH, Munster, by PPG Industries Ohio, Inc., Cleveland, OH, filed with the European Patent Office on Apr. 5, 2012, 21 pages.
B. Singh, P.S. Forgione, J.a. Sedlak, L. Anderson, "Carbamylmethylated Melamines, Novel Crosslinkers for the Coatings Industry", Advanced Organic Coatings Science and Technology Series, 1991, pp. 193 to 207, vol. 13, Stamford, CT.
English Translation of International Preliminary Report on Patentability for International Application No. PCT/EP2007/011190 issued Jun. 7, 2009.
International Search Report for International Application No. PCT/EP2007/011190 mailed Apr. 14, 2008.
English Translation of Written Opinion for International Application No. PCT/EP2007/011190 mailed Apr. 14, 2008.
English Translation of International Preliminary Report on Patentability for International Application No. PCT/EP2007/011191 issued Jun. 7, 2009.
International Search Report for International Application No. PCT/EP2007/011191 mailed Apr. 14, 2008.
English Translation of Written Opinion for International Application No. PCT/EP2007/011191 mailed Apr. 14, 2008.
English Translation of International Preliminary Report on Patentability for International Application No. PCT/EP2007/011192 issued Jun. 7, 2009.
International Search Report for International Application No. PCT/EP2007/011192 mailed Apr. 14, 2008.
English Translation of Written Opinion for International Application No. PCT/EP2007/011192 mailed Apr. 14, 2008.
English Translation of International Preliminary Report on Patentability for International Application No. PCT/EP2008/010808 issued Jul. 20, 2010.
International Search Report of International Application No. PCT/EP2008/010808 mailed Apr. 3, 2009.
Written Opinion for International Application No. PCT/EP2008/010808 mailed Apr. 3, 2009.
English Translation of International Preliminary Report on Patentability for International Application No. PCT/EP2008/010810 issued Jul. 20, 2010.
International Search Report of International Application No. PCT/EP2008/010810 mailed Apr. 28, 2009.
English Translation of Written Opinion for International Application Mo. PCT/EP2008/010810 mailed Apr. 28, 2009.
English Translation of International Preliminary Report on Patentability for International Application No. PCT/EP2009/004581 issued Jan. 18, 2011.
International Search Report for international Application No. PCT/EP2009/004581 mailed Oct. 5, 2009.
Written Opinion for International Application No. PCT/EP2009/004581 mailed Oct. 5, 2009.
English Translation of International Preliminary Report on Patentability for International Application No. PCT/EP2009/006110 issued Jun. 7, 2011.
English Translation of International Search Report for International Application No. PCT/EP2009/006110 mailed Nov. 25, 2009.
English Translation of Written Opinion for International Application No. PCT/EP2009/006110 mailed Nov. 25, 2009.
English Translation of International Preliminary Report on Patentability for International Application No. PCT/EP2010/001422 issued Jan. 17, 2012.
English Translation of International Search Report for International Application No. PCT/EP2010/001422 mailed Jul. 5, 2010.
English Translation of Written Opinion for International Application No. PCT/EP2010/001422 mailed Jul. 5, 2010.

(56) References Cited

OTHER PUBLICATIONS

English Translation of International Preliminary Report on Patentability for International Application No. PCT/EP2010/001421 issued Dec. 16, 2011, 8 pages.

English Translation of International Search Report for International Application No.. PCT/EP2010/001421 mailed Jul. 2, 2010, 2 pages.
English Translation of Written Opinion for International Application No. PCT/EP2010/001421 mailed Jul. 2, 2010, 7 pages.

\* cited by examiner

COATING AGENT HAVING HIGH SCRATCH RESISTANCE AND HIGH WEATHERING RESISTANCE

CROSS REFERENCE TO RELATED APPLICATIONS

This application is a National Phase Application of Patent Application PCT/EP2008/010809 filed on 18 Dec. 2008, which claims priority to DE102007061856.7, filed 19 Dec. 2007, both of which are hereby incorporated by reference in their entirety.

FIELD OF THE INVENTION

The present invention relates to coating compositions comprising
 (a) at least one hydroxyl-containing compound (A),
 (b) at least one compound (B) having free and/or blocked isocyanate groups, and
 (c) at least one catalyst (C) for the crosslinking of silane groups,
wherein one or more constituents of the coating composition contain hydrolyzable silane groups.

BACKGROUND OF THE INVENTION

WO-A-01/98393 describes 2K (2-component) coating compositions comprising a polyol binder component and a polyisocyanate crosslinker component partly functionalized with alkoxysilyl groups. These coating compositions are used as primers and are optimized for adhesion to metallic substrates, especially aluminum substrates. Over these coating compositions, as part of an OEM finish or a refinish, it is possible to apply basecoat/clearcoat systems. In terms of scratch resistance and weathering stability, the coating compositions of WO 01/98393 are not optimized.

EP-A-0 994 117 describes moisture-curable mixtures comprising a polyol component and a polyisocyanate component which may partly have been reacted with a monoalkoxysilylalkylamine that has undergone reaction preferably to an aspartate. Although coatings formed from such mixtures do have a certain hardness, they are nevertheless of only limited suitability for OEM applications in terms of their weathering stability and, in particular, their scratch resistance.

US-A-2006/0217472 describes coating compositions which can comprise a hydroxy-functional acrylate, a low molecular mass polyol component, a polyisocyanate, and an amino-functional alkoxysilyl component, preferably bisalkoxysilylamine. Such coating compositions are used as clearcoat material in basecoat/clearcoat systems and lead to scratchproof coatings. Coating compositions of this kind, however, have only very limited storage qualities, and the resulting coatings have low weathering stability, particularly with respect to UV radiation in a wet/dry cycle.

WO 2006/042585 describes clearcoat materials which are suitable for OEM finishing and which as their main binder component comprise polyisocyanates whose isocyanate groups, preferably to an extent of more than 90 mol %, have undergone reaction with bisalkoxysilylamines. Clearcoat materials of this kind combine excellent scratch resistance with high chemical and weathering resistance. But there is still a need for a further improvement in the weathering stability, particularly with respect to cracking under UV irradiation in a wet/dry cycle, with retention of the high level of scratchproofing.

EP-A-1 273 640 describes 2K coating compositions composed of a polyol component and of a crosslinker component consisting of aliphatic and/or cycloaliphatic polyisocyanates, 0.1 to 95 mol % of the free isocyanate groups originally present having undergone reaction with bisalkoxysilylamine. These coating compositions can be used for OEM finishing and when fully cured combine good scratch resistance with effective resistance to environmental influences. Nevertheless, these coating compositions have a particularly strong propensity toward aftercrosslinking, with the consequence—directly after thermal curing to completion—of inadequate scratch resistance of the coatings. The significant after crosslinking likewise impacts adversely on the weathering stability, since there is an increased risk of stress cracks.

In the case of coating materials which crosslink simultaneously through the formation of urethane bonds and the formation of siloxane bridges, the problem arises that the hydrolyzable silane groups are very reactive with respect to water. This may lead, for example, in the case of the pneumatic application of these coating materials, to disruptive secondary reactions on the basis of the atmospheric humidity. In the process, gel particles may form which adversely affect the quality of the resulting film coatings.

It was an object of the present invention to provide coating compositions, particularly for the clearcoat film in OEM finishes and automotive refinishes, that lead to a network with a high degree of weathering stability, the unwanted formation of moieties unstable to hydrolysis and weathering being very largely suppressed, in order to ensure high acid resistance. In addition, the coating compositions ought to lead to coatings which have a high degree of scratchproofing directly after thermal curing, and in particular a high retention of gloss after scratch exposure. Moreover, the coatings and coating systems, especially the clearcoat systems, ought to be able to be produced even in film thicknesses>40 µm without stress cracks occurring. This is a key requirement for the use of the coatings and coating systems, particularly of the clearcoat systems, in the technologically and esthetically particularly demanding field of automotive OEM finishing.

The intention in particular was to provide clearcoat systems featuring high resistance, particularly to cracking, under weathering with UV radiation in a wet/dry cycle, in combination with outstanding scratchproofing.

Furthermore, the new coating compositions ought to be preparable easily and with very good reproducibility, and ought not to present any environmental problems during application of the coating material.

A key problem facing the present invention is to prevent hydrolysis of the silane groups by the influence of atmospheric humidity during the application for coating materials which are cured by hydrolysis of alkoxysilane compounds and, additionally, by the reaction of isocyanate groups with hydroxyl groups. Surprisingly it has been found that this problem can be solved through the addition to the coating compositions of a compound which is very unstable to hydrolysis. The reaction of this compound proceeds more rapidly than the silane hydrolysis and thereby suppresses the unwanted formation of gel particles.

SUMMARY OF THE INVENTION

The present invention accordingly provides coating compositions, of the type specified at the outset, which comprise a water scavenger as further constituent (D).

Advantageous embodiments of the invention will become apparent from the dependent claims.

The water scavenger is advantageously a trialkyl orthoformate, more particularly triethyl orthoformate.

In light of the prior art it was surprising and unforeseeable for the skilled worker that the objects on which the present invention was based could be achieved by means of the coating composition of the invention.

Patent application WO 2006/131314 A1 does in fact disclose using water scavengers in adhesives and sealants, inks, paints, and coatings that comprise silane-modified urea derivatives. However, it has been found that the use of trialkyl orthoformates, more particularly triethyl orthoformate, in the coating compositions of the invention that are under discussion here is advantageous over the water scavengers published in the stated patent application, namely vinylsilanes, CaO zeolites, silicic esters, alkylsilanes, and mixtures thereof. The reason for this is that the compounds formed from triethyl orthoformate, for example, in the course of the hydrolysis, namely formic acid and ethanol, being volatile compounds, depart the coating film when the coating compositions of the invention are subjected to thermal crosslinking.

The use of trimethyl orthoformate as a water scavenger in silane coating systems is described U.S. Pat. No. 5,225,248. Surprisingly, however, it has been found that, in the case of the coating materials of the present invention, not only is unwanted premature silane hydrolysis due to atmospheric humidity prevented, but also, furthermore, the storage stability of the coating compositions in respect of the reaction between isocyanate groups and hydroxyl groups is improved. This was not foreseeable in the light of the prior art.

Catalysts (C) used for the silane crosslinking are phosphorus catalysts, more particularly catalysts containing phosphorus and nitrogen. In this context it is also possible to use mixtures of two or more different catalysts (C).

Examples of suitable phosphorus catalysts (C) are substituted phosphonic diesters and diphosphonic diesters, preferably from the group consisting of acyclic phosphonic diesters, cyclic phosphonic diesters, acyclic diphosphonic diesters, and cyclic diphosphonic diesters. Catalysts of this kind are described for example in the German patent application DE-A-102005045228.

Use is made more particularly as catalyst, however, of substituted phosphoric monoesters and phosphoric diesters, preferably from the group consisting of acyclic phosphoric diesters and cyclic phosphoric diesters, more preferably amine adducts of the phosphoric monoesters and diesters.

The acyclic phosphoric diesters (C) are selected more particularly from the group consisting of acyclic phosphoric diesters (C) of the general formula (IV):

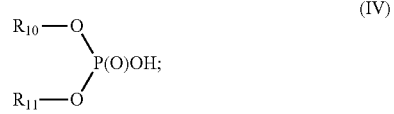

where the radicals $R_{10}$ and $R_{11}$ are selected from the group consisting of:
substituted and unsubstituted alkyl- having 1 to 20, preferably 2 to 16, and more particularly 2 to 10 carbon atoms, cycloalkyl- having 3 to 20, preferably 3 to 16, and more particularly 3 to 10 carbon atoms, and aryl- having 5 to 20, preferably 6 to 14, and more particularly 6 to 10 carbon atoms,
substituted and unsubstituted alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl-, the alkyl, cycloalkyl-, and aryl groups present therein in each case containing the above-recited number of carbon atoms; and
substituted and unsubstituted radical- of the above-recited kind, containing at least one, more particularly one, heteroatom selected from the group consisting of oxygen atom, sulfur atom, nitrogen atom, phosphorus atom, and silicon atom, more particularly oxygen atom, sulfur atom, and nitrogen atom; and additionally also being able to represent hydrogen (partial esterfication).

The catalysts (C) are used preferably in fractions of 0.01 to 20% by weight, more preferably in fractions of 0.1 to 10% by weight, based on the nonvolatile constituents of the coating composition of the invention.

The coating composition advantageously additionally contains a catalyst for the reaction of the isocyanate groups with the hydroxyl groups. The conventional catalysts known in the prior art for urethane formation—for example, tertiary amines—can be used. In that case, however, it must be ensured that no disruptive interaction occurs between the silane catalysts and the urethane catalysts. The suitable catalyst combinations should therefore be tested in each individual case, disruptive secondary reactions being easily recognizable.

The components of the invention can be prepared particularly easily and with very good reproducibility, and do not cause any significant toxicological or environmental problems during application of the coating material.

The coating compositions of the invention produce new coatings and coating systems, especially clearcoat systems, which are highly scratchproof and, in contrast to common, highly crosslinked scratchproof systems, are acid-resistant. Moreover, the coatings and coating systems of the invention, especially the clearcoat systems, can be produced even in film thicknesses>40 μm without stress cracks occurring. Consequently the coatings and coating systems of the invention, especially the clearcoat systems, can be used in the technologically and esthetically particularly demanding field of automotive OEM finishing. In that context they are distinguished by particularly high carwash resistance and scratch resistance. In particular, the coatings possess their higher scratch resistance directly after the curing of the coatings to completion, thereby allowing the coatings to be handled with no problems directly following the curing to completion. The resistance of the coatings of the invention to cracking under UV radiation and wet/dry cycling in the CAM180 test (to DIN EN ISO 11341 February 1998 and DIN EN ISO 4892-2 November 2000), moreover, in combination with a high scratch resistance, is outstanding.

DETAILED DESCRIPTION OF AN EMBODIMENT OF THE INVENTION

The Structural Units Having Hydrolyzable Silane Groups

It is essential to the invention that one or more constituents of the coating composition contain hydrolyzable silane groups. Particularly suitable in this context are coating compositions wherein one or more constituents of the coating composition at least partly contain one or more, alike or different structural units of the formula (I)

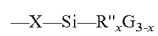 (I)

with

G=identical or different hydrolyzable groups,

X=organic radical, more particularly linear and/or branched alkylene or cycloalkylene radical having 1 to 20 carbon atoms, very preferably X=alkylene radical having 1 to 4 carbon atoms, R"=alkyl, cycloalkyl, aryl, or aralkyl, it being possible for the carbon chain to be interrupted by nonadjacent oxygen, sulfur or NRa groups, with Ra=alkyl, cycloalkyl, aryl or aralkyl, preferably R"=alkyl radical, more particularly having 1 to 6 C atoms, x=0 to 2, preferably 0 to 1, more preferably x=0.

The structure of these silane radicals as well affects the reactivity and hence also the very substantial reaction during the curing of the coating, hence affecting the establishment of an extremely low post-crosslinking index (PCI).

With regard to the compatibility and the reactivity of the silanes it is preferred to use silanes having 3 hydrolyzable groups, i.e., x=0.

The hydrolyzable groups G may be selected from the group of halogens, more particularly chlorine and bromine, from the group of alkoxy groups, from the group of alkylcarbonyl groups, and from the group of acyloxy groups. Particular preference is given to alkoxy groups (OR').

The respective preferred alkoxy radicals (OR') may be alike or different; what is critical for the structure of the radicals, however, is to what extent they influence the reactivity of the hydrolyzable silane groups. Preferably R' is an alkyl radical, more particularly having 1 to 6 C atoms. Particularly preferred radicals R' are those which increase the reactivity of the silane groups, i.e., represent good leaving groups. To this extent, a methoxy radical is preferred over an ethoxy radical, which is preferred in turn over a propoxy radical. With particular preference R'=ethyl and/or methyl, more particularly methyl.

The reactivity of organofunctional silanes can also be significantly influenced, furthermore, through the length of the spacers X between silane functionality and organic functional group serving for reaction with the modifying constituent. As examples of this, mention may be made of the "alpha" silanes, available from the company Wacker, in which there is a methylene group, instead of the propylene group present in the case of "gamma" silanes, between Si atoms and functional group. To illustrate this it is observed that methacryloyloxymethyltrimethoxysilane ("alpha" silane, e.g., commercial product GENIOSIL® XL 33 from Wacker) is used in preference over methacryloyloxypropyltrimethoxysilane ("gamma" silane, e.g., commercial product GENIOSIL® GF 31 from Wacker) in order to introduce the hydrolyzable silane groups into the coating composition.

Very generally, spacers which increase the reactivity of the silanes are preferred over spacers which lower the reactivity of the silanes.

In addition, the functionality of the silanes, as well, has an influence on the post-crosslinking index. By functionality in this context is meant the number of radicals of the formula (I) per molecule. The term monofunctional silane therefore refers to silanes which per silane molecule in each case introduce one radical of the formula (I) into the constituent that is to be modified. The term difunctional silane refers to silanes which per silane molecule introduce in each case two radicals of the formula (I) into the constituent.

Particular preference is given, in accordance with the invention, to coating compositions wherein the constituents have been modified with a mixture of a monofunctional silane and a difunctional silane. Difunctional silanes used in this context are more particularly those amino-functional disilanes of the formula (IIa) that are described below, and monofunctional silanes used are more particularly those silanes of the formula (IIIa) that are described later on below.

Finally, it is also possible for nonfunctional substituents on the organofunctional silane that is used to introduce the structural units (I) and/or (II) and/or (III) to influence the reactivity of the hydrolyzable silane group. This may be illustrated by way of example taking as an example bulky voluminous substituents on the amine function, which are able to reduce the reactivity of amine-functional silanes. Against this background N-(n-butyl)-3-aminopropyltrimethoxysilane is preferred before N-cyclohexyl-3-aminopropyltrimethoxysilane for the introduction of the structural units (III).

Very generally, the radicals which increase the reactivity of the silanes are preferred over radicals which lower the reactivity of the silanes.

The structural units of the formula (I) can be introduced into the constituents of the coating composition in different ways. A feature common to the various ways, however, is that the introduction of the structural units is accomplished via a reaction between the functional groups of the constituents it is intended to modify and complementary functional groups of the silane. By way of example, therefore, various possibilities for introducing the structural units (I) into the compound (A) containing hydroxyl groups and, where appropriate, further reactive groups as well, and/or into the compound (B) containing isocyanate groups, are set out below.

Use is made, more particularly in the context of Michael additions, of, for example, primary aminosilanes, such as 3-aminopropyltriethoxysilane (available for example under the brand name Geniosil® GF 93 from Wacker Chemie), 3-aminopropyltrimethoxysilane (available for example under the brand name Geniosil® GF 96 from Wacker Chemie), N-(2-aminoethyl)-3-aminopropyltrimethoxysilane (available for example under the brand name Geniosil® GF 9 and also Geniosil® GF 91 from Wacker Chemie), N-(2-aminoethyl)-3-aminopropylmethyldimethoxysilane (available for example, under the brand name Geniosil® GF 95 from Wacker Chemie), and the like.

Use is made, more particularly in the context of additions to isocyanate-functional compounds, of, for example, secondary aminosilanes, such as, for example, bis-(2-trimethoxysilylethyl)amine, bis-(2-triethoxysilyl-ethyl)amine, bis(3-triethoxysilylpropyl)amine (available under the trade name Dynasylan® 1122 from Degussa), bis(3-trimethoxysilyl-propyl)amine (available under the trade name Dynasylan® 1124 from Degussa), bis(4-triethoxysilylbutyl)amine, N-(n-butyl)-3-aminopropyltrimethoxysilane (available under the trade name Dynasylan® 1189 from Degussa), N-(n-butyl)-3-aminopropyltriethoxysilane, N-cyclohexyl-3-aminopropyltrimethoxysilane (available under the brand name Geniosil® GF 92 from Wacker Chemie), N-cyclohexyl-3-aminopropyltriethoxysilane, N-cyclohexylaminomethylmethyldiethoxysilane (available from Wacker Chemie under the trade name Geniosil® XL 924), N-cyclohexylaminomethyltriethoxysilane (available from Wacker Chemie under the trade name Geniosil® XL 926), N-phenylaminomethyltrimethoxysilane (available from Wacker Chemie under the trade name Geniosil® XL 973), and the like.

Epoxy-functional silanes can be used more particularly for addition to compounds with carboxylic acid or anhydride functionality. Examples of suitable epoxy-functional silanes are 3-glycidyloxypropyltrimethoxysilane (available from Degussa under the trade name Dynasylan® GLYMO), 3-glycidyloxypropyltriethoxysilane (available from Degussa under the trade name Dynasylan® GLYEO), and the like.

Anhydride-functional silanes can be employed more particularly for addition to epoxy-functional compounds. An example that may be mentioned of a silane with anhydride functionality is 3-(triethoxysilyl)propylsuccinic anhydride (available from Wacker Chemie under the trade name Geniosil® GF 20).

Silanes of this kind can be used in the context of Michael reactions or else in the context of metal-catalyzed reactions. Those exemplified are 3-methacryloyloxypropyltrimethoxysilane (available for example from Degussa under the trade name Dynasilan® MEMO, or from Wacker Chemie under the trade name Geniosil® GF 31), 3-methacryloyloxypropyltriethoxysilane, vinyltrimethoxysilane (available, among others, from Wacker Chemie under the trade name Geniosil® XL 10), vinyldimethoxymethylsilane (available from, among others, Wacker Chemie under the trade name Geniosil® XL 12), vinyltriethoxysilane (available, among others, from Wacker Chemie under the trade name Geniosil® GF 56), (methacryloyloxymethyl)methyldimethoxysilane (available, among others, from Wacker Chemie under the trade name Geniosil® XL 32), methacryloyloxymethyltrimethoxysilane (available, among others, from Wacker Chemie under the trade name Geniosil® XL 33), (methacryloyloxymethyl)methyldiethoxysilane (available, among others, from Wacker Chemie under the trade name Geniosil® XL 34), methacryloyloxymethyltriethoxysilane (available, among others, from Wacker Chemie under the trade name Geniosil® XL 36).

Silanes with isocyanate function or carbamate function are employed in particular in the context of reactions with hydroxy-functional compounds. Examples of silanes with isocyanate function are described in WO 07/03857, for example.

Examples of suitable isocyanatoalkyltrialkoxysilanes are isocyanatopropyltrimethoxysilane, isocyanatopropylmethyldimethoxysilane, isocyanatopropylmethyldiethoxysilane, isocyanatopropyltriethoxysilane, isocyanatopropyltriisopropoxysilane, isocyanatopropylmethyldiisopropoxysilane, isocyanatoneohexyltrimethoxysilane, isocyanatoneohexyldimethoxysilane, isocyanatoneohexyldiethoxysilane, isocyanatoneohexyl-triethoxysilane, isocyanatoneohexyltriisopropoxysilane, isocyanatoneo-hexyldiisopropoxysilane, isocyanatoisoamyltrimethoxysilane, isocyanato-isoamylmethyldimethoxysilane, isocyanatoisoamylmethyldiethoxysilane, isocyanatoisoamyltriethoxysilane, isocyanatoisoamyltriisopropoxysilane and isocyanatoisoamylmethyldiisopropoxysilane. Many isocyanatoalkyl-tri- and -di-alkoxysilanes are available commercially, for example, under the designation SILQUEST® from OSi Specialties, Inc., a Witco Corporation company.

The isocyanatopropylalkoxysilane used preferably has a high degree of purity, more particularly a purity of at least 95%, and is preferably free from additives, such as transesterification catalysts, which can lead to unwanted side reactions.

Use is made in particular of (isocyanatomethyl)methyldimethoxysilane (available from Wacker-Chemie under the brand name Geniosil® XL 42), 3-isocyanatopropyltrimethoxysilane (available from Wacker-Chemie under the brand name Geniosil® XL 40), and N-dimethoxy(methyl)silylmethyl O-methylcarbamate (available from Wacker-Chemie under the brand name Geniosil® XL 65).

More particular preference is given in accordance with the invention to coating compositions comprising at least one hydroxyl-containing compound (A) and at least one isocyanato-containing compound (B), wherein one or more constituents of the coating composition contain, as additional functional components, between 2.5 and 97.5 mol %, based on the entirety of structural units (II) and (III), of at least one structural unit of the formula (II)

$$—N(X—SiR''_x(OR')_{3-x})_n(X'—SiR''_y(OR')_{3-y})_m \quad (II)$$

where
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl, preferably R'=ethyl and/or methyl, X, X'=linear and/or branched alkylene or cycloalkylene radical having 1 to 20 carbon atoms, preferably X, X'=alkylene radical having 1 to 4 carbon atoms,
R''=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl, preferably R''=alkyl radical, more particularly having 1 to 6 C atoms,
n=0 to 2, m=0 to 2, m+n=2, and x,y=0 to 2,
and
between 2.5 and 97.5 mol %, based on the entirety of structural units (II) and (III), of at least one structural unit of the formula (III)

$$—Z—(X—SiR''_x(OR')_{3-x}) \quad (III),$$

where
Z=—NH—, —NR—, —O—, with
R=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl.
x=0 to 2, and
X, R', R'' being as defined for formula (II).

Very particular preference is given to coating compositions wherein one or more constituents of the coating composition contain between 5 and 95 mol %, more particularly between 10 and 90 mol %, with particular preference between 20 and 80 mol %, and very particularly between 30 and 70 mol %, based in each case on the entirety of structural units (II) and (III), of at least one structural unit of the formula (II) and between 5 and 95 mol %, more particularly between 10 and 90 mol %, with particular preference between 20 and 80 mol %, and very particularly between 30 and 70 mol %, based in each case on the entirety of structural unit (II) and (III), of at least one structural unit of the formula (III).

The Hydroxyl-Containing Compound (A)

As hydroxyl-containing compound (A) it is preferred to use low molecular mass polyols and also oligomeric and/or polymeric polyols.

Low molecular mass polyols used are, for example, diols, such as, preferably, ethylene glycol, neopentyl glycol, 1,2-propanediol, 2,2-dimethyl-1,3-propanediol, 1,4-butanediol, 1,3-butanediol, 1,5-pentane-diol, 2,2,4-trimethyl-1,3-pentanediol, 1,6-hexanediol, 1,4-cyclohexane-dimethanol, and 1,2-cyclohexanedimethanol, and also polyols, such as, preferably, trimethylolethane, trimethylolpropane, trimethylolhexane, 1,2,4-butanetriol, pentaerythritol, and dipentaerythritol.

Low molecular mass polyols of this kind are preferably admixed in minor proportions to the oligomeric and/or polymeric polyol component (A).

The preferred oligomeric and/or polymeric polyols (A) have mass-average molecular weights Mw>500 daltons, as measured by means of GPC (gel permeation chromatography), preferably between 800 and 100 000 daltons, in particular between 1000 and 50 000 daltons. Particularly preferred are polyester polyols, polyurethane polyols, polysiloxane polyols, and, in particular, polyacrylate polyols and/or polymethacrylate polyols, and their copolymers, referred to as polyacrylate polyols below. The polyols preferably have an OH number of 30 to 400 mg KOH/g, in particular between 100 and 300 KOH/g. The glass transition temperatures, as measured by DSC (differential thermal analysis), of the polyols are preferably between −150 and 100° C., more preferably between −120° C. and 80° C.

Suitable polyester polyols are described for example in EP-A-0 994 117 and EP-A-1 273 640. Polyurethane polyols are prepared preferably by reacting polyester polyol prepolymers with suitable di- or polyisocyanates and are described in EP-A-1 273 640, for example. Suitable polysiloxane polyols are described for example in WO-A-01/09260, and the polysiloxane polyols recited therein can be employed preferably in combination with further polyols, especially those having relatively high glass transition temperatures.

The polyacrylate polyols that are very particularly preferred in accordance with the invention are generally copolymers and preferably have mass-average molecular weights Mw of between 1000 and 20 000 daltons, in particular between 1500 and 10 000 daltons, measured in each case by means of gel permeation chromatography (GPC) against a polystyrene standard. The glass transition temperature of the copolymers is generally between −100 and 100° C., in particular between −50 and 80° C. (measured by means of DSC measurements). The polyacrylate polyols preferably have an OH number of 60 to 250 mg KOH/g, in particular between 70 and 200 KOH/g, and an acid number of between 0 and 30 mg KOH/g.

The hydroxyl number (OH number) indicates how many mg of potassium hydroxide are equivalent to the amount of acetic acid bound by 1 g of substance during acetylation. For the determination, the sample is boiled with acetic anhydride-pyridine and the acid formed is titrated with potassium hydroxide solution (DIN 53240-2). The acid number here indicates the number of mg of potassium hydroxide consumed in neutralizing 1 g of the respective compound of component (b) (DIN EN ISO 2114).

Hydroxyl-containing monomer units used are preferably hydroxyalkyl acrylates and/or hydroxyalkyl methacrylates, such as, in particular, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and, in particular, 4-hydroxybutyl acrylate and/or 4-hydroxybutyl methacrylate.

Further monomer units used for the polyacrylate polyols are preferably alkyl methacrylates and/or alkyl methacrylates, such as, preferably, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate, or, in particular, cyclohexyl acrylate and/or cyclohexyl methacrylate.

Further monomer units which can be used for the polyacrylate polyols are vinylaromatic hydrocarbons, such as vinyltoluene, alpha-methylstyrene or, in particular, styrene, amides or nitriles of acrylic or methacrylic acid, vinyl esters or vinyl ethers, and, in minor amounts, in particular, acrylic and/or methacrylic acid.

In a further embodiment of the invention the hydroxyl-containing compound A as well as the hydroxyl groups comprises structural units of the formula (I) and/or of the formula (II) and/or of the formula (III).

Structural units of the formula (II) can be introduced into the compound (A) by incorporation of monomer units containing such structural units, or by reaction of polyols containing further functional groups with a compound of the formula (IIa)

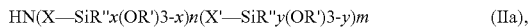

HN(X—SiR"x(OR')3-x)n(X'—SiR"y(OR')3-y)m  (IIa), where the substituents are as defined above. For the reaction of the polyol with the compound (IIa), the polyol, correspondingly, has further functional groups which react with the secondary amino group of the compound (IIa), such as acid or epoxy groups in particular. Inventively preferred compounds (IIa) are bis(2-ethyltrimethoxysilyl)amine, bis(3-propyltrimethoxysilyl)amine, bis(4-butyltrimethoxysilyl)amine, bis(2-ethyltriethoxysilyl)amine, bis(3-propyltrimethoxysilyl)amine and/or bis(4-butyltriethoxysilyl)amine. Bis(3-propyltrimethoxysilyl)amine is especially preferred. Aminosilanes of this kind are available for example under the brand name DYNASILAN® from DEGUSSA or Silquest® from OSI.

Monomer units which carry the structural elements (II) are preferably reaction products of acrylic and/or methacrylic acid or of epoxy-containing alkyl acrylates and/or methacrylates with the abovementioned compounds (IIa).

Structural units of the formula (III) can be introduced into the compound (A) by incorporation of monomer units containing such structural units or by reaction of polyols containing further functional groups with a compound of the formula (IIIa)

H—Z—(X—SiR"x(OR')3-x)  (IIIa), where the substituents are as defined above. For the reaction of the polyol with the compound (IIIa), the polyol, correspondingly, has further functional groups which react with the functional group —ZH of the compound (IIIa), such as acid, epoxy or ester groups in particular. Inventively preferred compounds (IIIa) are omega-aminoalkyl- or omega-hydroxyalkyltrialkoxysilanes, such as, preferably, 2-aminoethyltrimethoxysilane, 2-aminoethyitriethoxysilane, 3-aminopropyltrimethoxysilane, 3-aminopropyltriethoxysilane, 4-aminobutyltrimethoxysilane, 4-aminobutyltriethoxysilane, 2-hydroxyethyltrimethoxysilane, 2-hydroxyethyltriethoxysilane, 3-hydroxypropyltrimethoxysilane, 3-hydroxypropyltriethoxysilane, 4-hydroxybutyltrimethoxysilane, and 4-hydroxybutyltriethoxysilane. Particularly preferred compounds (IIIa) are N-(2-(trimethoxysilyl)-ethyl)alkylamines, N-(3-(trimethoxysilyl)propyl)alkylamines, N-(4-(trimethoxysilyl)butyl)alkylamines, N-(2-(triethoxysilyl)ethyl)alkylamines, N-(3-(triethoxysilyl)propyl)alkylamines and/or N-(4-(triethoxysilyl)butyl)alkylamines. N-(3-(Trimethoxysilyl)propyl)butylamine is especially preferred. Aminosilanes of this kind are available for example under the brand name DYNASILAN® from DEGUSSA or Silquest® from OSI.

Monomer units which carry the structural elements (III) are preferably reaction products of acrylic and/or methacrylic acid or of epoxy-containing alkyl acrylates and/or methacrylates, and also, in the case of hydroxy-functional alkoxysilyl compounds, transesterification products of alkyl acrylates and/or methacrylates, especially with the abovementioned hydroxy- and/or amino-functional alkoxysilyl compounds (IIIa).

The Isocyanate-Containing Compounds (B)

As component (B), the coating compositions of the invention comprise one or more compounds having free, i.e., unblocked, and/or blocked isocyanate groups. Preferably the coating compositions of the invention comprise compounds (B) having free isocyanate groups. The free isocyanate groups of the isocyanato-containing compounds B may also, however, be used in blocked form. This is preferably the case when the coating compositions of the invention are used as one-component systems.

The di- and/or polyisocyanates which serve as core structures for the isocyanato-containing compounds (B) used with preference in accordance with the invention are preferably conventional substituted or unsubstituted aromatic, aliphatic, cycloaliphatic and/or heterocyclic polyisocyanates. Examples of preferred polyisocyanates are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates. Additionally preferred polyisocyanates are the biuret dimers and the isocyanurate trimers of the aforementioned diisocyanates.

Particularly preferred polyisocyanates are hexamethylene 1,6-diisocyanate, isophorone diisocyanate, and 4,4'-methylenedicyclohexyl diisocyanate, their biuret dimers and/or isocyanurate trimers.

In a further embodiment of the invention the polyisocyanates are polyisocyanate prepolymers containing urethane structural units which are obtained by reacting polyols with a stoichiometric excess of aforementioned polyisocyanates. Polyisocyanate prepolymers of this kind are described for example in U.S. Pat. No. 4,598,131.

The isocyanato-containing compounds (B) that are especially preferred in accordance with the invention, functionalized with the structural units (II) and (III), are prepared with preference by reacting the aforementioned di- and/or polyisocyanates with the aforementioned compounds (IIa) and (IIIa), by reacting
between 2.5 and 90 mol %, preferably 5 to 85 mol %, more preferably 7.5 to 80 mol %, of the isocyanate groups in the core polyisocyanate structure with at least one compound (IIa) and
between 2.5 and 90 mol %, preferably 5 to 85 mol %, more preferably 7.5 to 80 mol %, of the isocyanate groups in the core polyisocyanate structure with at least one compound (IIIa).

The total fraction of the isocyanate groups reacted with the compounds (IIa) and (IIIa) in the polyisocyanate compound (B) is between 5 and 95 mol %, preferably between 10 and 90 mol %, more preferably between 15 and 85 mol % of the isocyanate groups in the core polyisocyanate structure. Particularly in the case of a high degree of silanization, i.e., when a high proportion of the isocyanate groups, more particularly at least 50 mol %, having been reacted with the compounds (IIa)/(IIIa), the isocyanate groups are reacted advantageously with a mixture of the compounds (IIa) and (IIIa).

Particularly preferred compounds (IIa) are bis(2-ethyltrimethoxysilyl)amine, bis(3-propyltrimethoxysilyl)amine, bis(4-butyltrimethoxysilyl)amine, bis(2-ethyltriethoxysilyl)amine, bis(3-propyltrimethoxysilyl)amine and/or bis(4-butyltriethoxysilyl)amine. Bis(3-propyltrimethoxysilyl)amine is especially preferred. Aminosilanes of this kind are available for example under the brand name DYNASILAN® from DEGUSSA or Silquest® from OSI.

Preferred compounds (IIIa) are 2-aminoethyltrimethoxysilane, 2-aminoethyltriethoxysilane, 3-aminopropyltrimethoxysilane, 3-aminopropyltriethoxysilane, 4-aminobutyltrimethoxysilane, 4-aminobutyltriethoxysilane, 2-hydroxyethyltrimethoxysilane, 2-hydroxyethyltriethoxysilane, 3-hydroxypropyltrimethoxysilane, 3-hydroxypropyltriethoxysilane, 4-hydroxybutyltrimethoxysilane, and 4-hydroxybutyltriethoxysilane.

Particularly preferred compounds (IIIa) are N-(2-(trimethoxysilyl)ethyl)alkylamines, N-(3-(trimethoxysilyl)propyl)alkylamines, N-(4-(trimethoxysilyl)butyl)alkylamines, N-(2-(triethoxysilyl)ethyl)alkylamines, N-(3-(triethoxysilyl)propyl)alkylamines and/or N-(4-(triethoxysilyl)butyl)alkylamines. N-(3-(Trimethoxysilyl)propyl)butylamine is especially preferred. Aminosilanes of this kind are available for example under the brand name DYNASILAN® from DEGUSSA or Silquest® from OSI.

Especially preferred isocyanato-containing compounds (B) are reaction products of hexamethylene 1,6-diisocyanate and/or isophorone diisocyanate, and/or their isocyanurate trimers, with bis(3-propyltrimethoxysilyl)amine and N-(3-(trimethoxysilyl)propyl)butylamine. The reaction of the isocyanato-containing compounds (B) with the compounds (IIa) and (IIIa) takes place preferably in inert gas at temperatures of not more than 100° C., preferably of not more than 60° C.

The free isocyanate groups of the isocyanato-containing compounds B can also be used in blocked form. This is preferably the case when the coating compositions of the invention are used as one-component systems. For the purpose of blocking it is possible in principle to use any blocking agent which can be used for blocking polyisocyanates and which has a sufficiently low unblocking temperature. Blocking agents of this kind are very familiar to the skilled worker. It is preferred to use blocking agents as described in EP-A-0 626 888 and EP-A-0 692 007.

The Combination of Components A and B, and Further Components of the Coating Composition The weight fraction of hydroxyl-containing compounds A to be employed, based on the weight fraction of the isocyanato-containing compounds B, is dependent on the hydroxy equivalent weight of the polyol and on the equivalent weight of the free isocyanate groups of the polyisocyanate B.

It is preferred that, in the coating composition of the invention, one or more constituents contain between 2.5 to 97.5 mol %, based on the sum of structural units (II) and (III), of at least one structural unit (II) and between 2.5 to 97.5 mol %, based on the sum of structural units (II) and (III), of at least one structural unit (III).

The coating compositions of the invention contain preferably between 2.5% and 97.5%, more preferably between 5% and 95%, very preferably between 10% and 90%, and in particular between 20% and 80%, by weight, based on the amount of nonvolatile substances in the coating composition, of the hydroxyl-containing compounds (A), and preferably between 2.5% and 97.5%, more preferably between 5% and 95%, very preferably between 10% and 90%, and in particular between 20% and 80%, by weight, based on the amount of nonvolatile substances in the coating composition, of the isocyanato-containing compounds (B).

Based on the sum of the functional groups critical for crosslinking in the coating composition of the invention, formed from the fractions of the hydroxyl and isocyanate groups and also the fractions of the structural elements (I) and/or (II) and/or (III), the structural elements (I) and/or (II) and/or (III) are present preferably in fractions of 2.5 to 97.5 mol %, more preferably between 5 and 95 mol %, and very preferably between 10 and 90 mol %.

In a further embodiment of the invention the structural elements (I), (II) and/or (III) may additionally also be part of one or more further components, different than the components (A) and (B), in which case the criteria to be applied are those specified above. By way of example it is possible as further component to use oligomers or polymers containing alkoxysilyl groups, such as, for example, the poly(meth)acrylates specified in patents and patent applications U.S. Pat. No. 4,499,150, U.S. Pat. No. 4,499,151 or EP-A-0 571 073, as carriers of structural elements (III), or to use the compounds specified in WO-A-2006/042585, as carriers of structural elements (II). Generally speaking, components of this kind are used in fractions of up to 40%, preferably up to 30%, more preferably up to 25%, by weight, based on the nonvolatile constituents of the coating composition.

The weight fractions of the polyol A and of the polyisocyanate B are preferably selected such that the molar equivalent ratio of the unreacted isocyanate groups of the isocyanate-containing compounds (B) to the hydroxyl groups of the hydroxyl-containing compounds (A) is between 0.9:1 and 1:1.1, preferably between 0.95:1 and 1.05:1, more preferably between 0.98:1 and 1.02:1.

Where the compositions are one-component coating compositions, a selection is made of the isocyanato-containing compounds (B) whose free isocyanate groups have been blocked with the blocking agents described above.

In the case of the inventively preferred 2-component (2K) coating compositions, a coating component comprising the hydroxyl-containing compound (A) and also further components, described below, is mixed conventionally with a further coating component, comprising the isocyanato-containing compound (B) and, where appropriate, further of the components described below, this mixing taking place shortly before the coating composition is applied; generally speaking, the coating component that comprises the compound (A) comprises the catalyst and also part of the solvent.

Solvents suitable for the coating compositions of the invention are in particular those which, in the coating composition, are chemically inert toward the compounds (A) and (B) and also do not react with (A) and (B) when the coating composition is being cured. Examples of such solvents are aliphatic and/or aromatic hydrocarbons such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents. The aprotic solvents or solvent mixtures preferably have a water content of not more than 1%, more preferably not more than 0.5%, by weight, based on the solvent.

Besides the compounds (A), (B), and (C) it is possible additionally to use further binders (E), which preferably are able to react and form network points with the hydroxyl groups of the compound (A) and/or with the free isocyanate groups of the compound (B) and/or with the alkoxysilyl groups of the compounds (A) and/or (B).

By way of example it is possible to use amino resins and/or epoxy resins as component (D). Suitable amino resins are the typical, known amino resins, some of whose methylol and/or methoxymethyl groups may have been defunctionalized by means of carbamate or allophanate groups. Crosslinking agents of this kind are described in patents U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, Volume 13, pages 193 to 207.

Generally speaking, such components (E) are used in fractions of up to 40%, preferably up to 30%, more preferably up to 25%, by weight, based on the nonvolatile constituents of the coating composition.

The coating composition of the invention may further comprise at least one typical, known coatings additive in effective amounts, i.e. in amounts preferably up to 30%, more preferably up to 25%, and in particular up to 20% by weight, in each case based on the nonvolatile constituents of the coating composition.

Examples of suitable coatings additives are:
particularly UV absorbers;
particularly light stabilizers such as HALS compounds, benzotriazoles or oxalanilides;
free-radical scavengers;
slip additives;
polymerization inhibitors;
defoamers;
reactive diluents, of the kind which are common knowledge from the prior art, and which are preferably inert toward the —Si(OR)3 groups;
wetting agents such as siloxanes, fluorine compounds, carboxylic monoesters, phosphoric esters, polyacrylic acids and their copolymers, or polyurethanes;
adhesion promoters such as tricyclodecanedimethanol;
flow control agents;
film-forming assistants such as cellulose derivatives;
fillers such as, for example, nanoparticles based on silicon dioxide, aluminum oxide or zirconium oxide; for further details refer to Römpp Lexikon "Lacke and Druckfarben" Georg Thieme Verlag, Stuttgart, 1998, pages 250 to 252;
rheology control additives, such as the additives known from patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum-magnesium silicates, sodium-magnesium, and sodium-magnesium-fluorine-lithium phyllosilicates of the montmorillonite type; silicas such as Aerosils; or synthetic polymers containing ionic and/or associative groups such as polyvinyl alcohol, poly(meth)acrylamide, poly(meth)acrylic acid, polyvinyl-pyrrolidone, styrene-maleic anhydride copolymers or ethylene-maleic anhydride copolymers and their derivatives, or hydrophobically modified ethoxylated urethanes or polyacrylates;
and/or flame retardants.

In a further embodiment of the invention the coating composition of the invention may additionally comprise further pigments and/or fillers and may serve for producing pigmented topcoats. The pigments and/or fillers employed for this purpose are known to the skilled worker.

Because the coatings of the invention produced from the coating compositions of the invention adhere excellently even to electrocoats, surfacer coats, basecoat systems or typical, known clearcoat systems that have already cured, they are outstandingly suitable not only for use in automotive OEM finishing but also for automotive refinish or for the modular scratchproofing of automobile bodies that have already been painted.

The coating compositions of the invention can be applied by any of the typical application methods, such as spraying, knife coating, spreading, pouring, dipping, impregnating, trickling or rolling, for example. In the course of such application, the substrate to be coated may itself be at rest, with the application equipment or unit being moved. Alternatively the substrate to be coated, in particular a coil, may be moved, with the application unit at rest relative to the substrate or being moved appropriately.

Preference is given to employing spray application methods, such as compressed-air spraying, airless spraying, high-speed rotation, electrostatic spray application (ESTA), alone or in conjunction with hot spray application such as hot-air spraying, for example.

The applied coating compositions of the invention can be cured after a certain rest time. The rest time serves, for example, for the leveling and devolatilization of the coating films or for the evaporation of volatile constituents such as solvents. The rest time may be assisted and/or shortened by the application of elevated temperatures and/or by a reduced humidity, provided this does not entail any damage or alteration to the coating films, such as premature complete crosslinking, for instance.

The thermal curing of the coating compositions has no peculiarities in terms of method but instead takes place in accordance with the typical, known methods such as heating in a forced-air oven or irradiation with IR lamps. The thermal cure may also take place in stages. Another preferred curing method is that of curing with near infrared (NIR) radiation.

The thermal cure takes place advantageously at a temperature of 30 to 200° C., more preferably 40 to 190° C., and in particular 50 to 180° C. for a time of 1 min up to 10 h, more preferably 2 min up to 5 h, and in particular 3 min to 3 h, although longer cure times may be employed in the case of the temperatures that are employed for automotive refinish, which are preferably between 30 and 90° C.

The coating compositions of the invention produce new cured coatings, especially coating systems, more particularly clearcoat systems; moldings, especially optical moldings; and self-supporting films, all of which are highly scratchproof and in particular are stable to chemicals and to weathering. The coatings and coating systems of the invention, especially the clearcoat systems, can in particular be produced even in film thicknesses>40 μm without stress cracks occurring.

For these reasons the coating compositions of the invention are of excellent suitability as decorative, protective and/or effect-imparting, highly scratchproof coatings and coating systems on bodies of means of transport (especially motor vehicles, such as motor cycles, buses, trucks or automobiles) or parts thereof; on buildings, both interior and exterior; on furniture, windows, and doors; on plastics moldings, especially CDs and windows; on small industrial parts, on coils, containers, and packaging; on white goods; on films; on optical, electrical, and mechanical components; and on hollow glassware and articles of everyday use.

The coating compositions and coating systems of the invention, especially the clearcoat systems, are employed in particular in the technologically and esthetically particularly demanding field of automotive OEM finishing and also of automotive refinish. With particular preference the coating compositions of the invention are used in multistage coating methods, particularly in methods where a pigmented basecoat film is first applied to an uncoated or precoated substrate and thereafter a film with the coating compositions of the invention is applied.

Not only water-thinnable basecoat materials but also basecoat materials based on organic solvents can be used. Suitable basecoat materials are described for example in EP-A-0 692 007 and in the documents cited there in column 3 lines 50 et seq. The applied basecoat material is preferably first dried, i.e., at least some of the organic solvent and/or water is stripped from the basecoat film in an evaporation phase. Drying is accomplished preferably at temperatures from room temperature to 80° C. Drying is followed by the application of the coating composition of the invention. Subsequently the two-coat system is baked, preferably under conditions employed for automotive OEM finishing, at temperatures from 30 to 200° C., more preferably 40 to 190° C., and in particular 50 to 180° C., for a time of 1 min up to 10 h, more preferably 2 min up to 5 h, and in particular 3 min to 3 h, although longer cure times may also be employed at the temperatures employed for automotive refinish, which are preferably between 30 and 90° C.

The coats produced with the coating composition of the invention are notable in particular for an especially high chemical stability and weathering stability and also for a very good carwash resistance and scratchproofing, in particular for an excellent combination of scratchproofing and weathering stability with respect to UV radiation in a wet/dry cycle.

In a further preferred embodiment of the invention, the coating composition of the invention is used as a transparent clearcoat material for coating plastics substrates, especially transparent plastics substrates. In this case the coating compositions include UV absorbers, which in terms of amount and type are also designed for effective UV protection of the plastics substrate. Here as well, the coating compositions are notable for an outstanding combination of scratchproofing and weathering stability with respect to UV radiation in a wet/dry cycle. The plastics substrates thus coated are used preferably as a substitute for glass components in automobile construction, the plastics substrates being composed preferably of polymethyl methacrylate or polycarbonate.

Preparation Examples

Demonstrated below is the use of water scavengers, using partially silanized systems as an example. For this purpose, an HDI trimer (Basonat HI 100, BASF AG), 40% of whose NCO groups were reacted with secondary aminosilane (Dynasilan 1189 and Dynasilan 1124 in a 10:90 ratio) was used as a model component. The solids of the material used was 63%; the solvent employed was solvent naphtha. The various solutions were formulated in accordance with table 1, and the water was stirred in for five minutes.

TABLE 1

|  | Partially silanized curing agent | Water | Triethyl orthoformate |
|---|---|---|---|
| 1a | 400 g | 0 g | 0 g |
| 1b | 400 g | 0 g | 12 g |
| 2a | 400 g | 0.08 g | 0 g |
| 2b | 400 g | 0.08 g | 12 g |
| 3a | 400 g | 0.16 g | 0 g |
| 3b | 400 g | 0.16 g | 12 g |
| 4a | 400 g | 0.24 g | 0 g |
| 4b | 400 g | 0.24 g | 12 g |

The relative viscosity of the model curing agent used was determined as a function of the water content. Where no water scavenger is used, the rise in viscosity is significantly greater.

The influence of the water scavenger becomes more marked when a completely reacted HDI trimer (Basonat HI 100) is used. In this case all of the NCO groups were reacted with a secondary aminosilane (in order to make the effect as clear as possible, this was done using a bis(gamma-trimethoxysilane)amine=Dynasilan 1124). In addition, a stoichiometric amount of water was added (6 mol of water per mole of Dynasilan 1124, which carries 2 trimethoxysilane functions per molecule; in other words, six theoretically hydrolyzable groups). The water scavenger added was, again, triethyl orthoformate, in an excess of 10 mol % in comparison to water.

|  | REF | +water w/o triethyl orthoformate (water scavenger) | +water w/triethyl orthoformate (water scavenger) |
| --- | --- | --- | --- |
| Curing agent | 20 | 20 | 20 |
| DI water | — | 0.85 | 0.85 |
| Triethyl orthoformate | — | — | 7.66 |

Again, the relative viscosity was determined using a DIN4 flow cup. Formulations with water, and with water and water scavenger, and the reference sample were investigated. The viscosity of the sample with water had gelled after 10 days.

The invention claimed is:

1. A coating composition comprising
(a) at least one hydroxyl-containing compound (A),
(b) at least one compound (B) having free and/or blocked isocyanate groups, and
(c) at least one catalyst (C) for the crosslinking of silane groups, wherein the at least one catalyst (C) is a substituted phosphonic diester, a phosphonic diester, a substituted phosphoric monoester or a phosphoric diester,
(d) a water scavenger constituent (D) comprising trialkyl orthoformate, wherein one or more constituents of the coating composition contain
between 2.5 and 97.5 mol %, based on the entirety of structural units (II) and (III), of at least one structural unit of the formula (II)

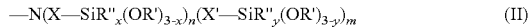

$$—N(X—SiR''_x(OR')_{3-x})_n(X'—SiR''_y(OR')_{3-y})_m \quad \text{(II)}$$

where
R'=hydrogen, alkyl or cycloalkyl, the carbon chain being interrupted or not interrupted by nonadjacent oxygen, sulfur or NRa groups, with Ra=alkyl, cycloalkyl, aryl or aralkyl, X, X'=linear and/or branched alkylene or cycloalkylene radical having 1 to 20 carbon atoms,
R''=alkyl, cycloalkyl, aryl or aralkyl, the carbon chain being interrupted or not interrupted by nonadjacent oxygen, sulfur or NRa groups, with Ra=alkyl, cycloalkyl, aryl or aralkyl,
n=0 to 2, m=0 to 2, m+n=2, and
x and y=0 to 2,
and
between 2.5 and 97.5 mol %, based on the entirety of structural units (II) and (III), of at least one structural unit of the formula (III)

$$—Z—(X—SiR''_x(OR')_{3-x}) \quad \text{(III),}$$

where
Z=—NH—, —NR—, —O—, with R=alkyl, cycloalkyl, aryl or aralkyl, the carbon chain being interrupted or not interrupted by nonadjacent oxygen, sulfur or NRa groups, with Ra=alkyl, cycloalkyl, aryl or aralkyl,
x=0 to 2, and
X, R', and R'' being as defined for formula (II).

2. The coating composition of claim 1, wherein the water scavenger (D) is triethyl orthoformate.

3. The coating composition of claim 1, further comprising a catalyst for the reaction of the isocyanate groups with the hydroxyl groups.

4. The coating composition of claim 1, wherein one or more constituents of the coating composition contain between 5 and 95 mol %, based in each case on the entirety of structural units (II) and (III), of at least one structural unit of the formula (II) and between 5 and 95 mol %, based in each case on the entirety of structural units (II) and (III), of at least one structural unit of the formula (III).

5. The coating composition of claim 1, wherein at least one compound (B) comprises at least one of the structural units (II), (III), or a combination thereof.

6. The coating composition of claim 5, wherein, in the at least one compound (B),
between 2.5 and 90 mol % of the isocyanate groups in the at least one compound (B) have undergone reaction with structural units (II) and
between 2.5 and 90 mol % of the isocyanate groups in the at least one compound (B) have undergone reaction with structural units (III), and
the total fraction of the isocyanate groups in the at least one compound (B) that have undergone reaction with structural units (II) and (III) is between 5 and 95 mol %.

7. The coating composition of claim 1, wherein the at least one compound (B) is selected from the group of 1,6-hexamethylene diisocyanate, isophorone diisocyanate, and 4,4'-methylenedicyclohexyl diisocyanate, the biuret dimers of the aforementioned polyisocyanates and/or the isocyanurate trimers of the aforementioned polyisocyanates.

8. The coating composition of claim 1, wherein the hydroxyl-containing compound (A) comprises at least one poly(meth)acrylate polyol.

9. The coating composition of claim 1, wherein the water scavenger is present in the coating composition in an amount of 0.01% to 10% by weight, based on the solids content of said composition.

10. A multistage coating method which comprises applying a pigmented basecoat film to an uncoated or precoated substrate and thereafter applying a film of the coating composition of claim 1.

11. A multistage coating method which comprises applying a pigmented basecoat film to an uncoated or precoated substrate and thereafter applying a film of the coating composition of claim 1, wherein, following the application of the pigmented basecoat film, the applied basecoat material is first dried at temperatures from room temperature to 80° C. and, following the application of the coating composition of claim 1, the system is cured at temperatures from 30 to 200° C. for a time of 1 min up to 10 h.

12. A multistage coating method which comprises applying a pigmented basecoat film to an uncoated or precoated substrate and thereafter applying a film of the coating composition of claim 1, wherein, following the application of the pigmented basecoat film, the applied basecoat material is first dried at temperatures from room temperature to 80° C. and, following the application of the coating composition of claim 1, the system is cured at temperatures from 30 to 200° C. for a time of 1 min up to 10 h, further wherein the coating composition of claim 1 is a clearcoat material used in automotive OEM finishing or automotive refinish.

13. A coating composition comprising
(a) at least one hydroxyl-containing compound (A),
(b) at least one compound (B) having free and/or blocked isocyanate groups, and
(c) at least one catalyst (C) for the crosslinking of silane groups, wherein the at least one catalyst (C) is a substituted phosphonic diester, a phosphonic diester, a substituted phosphoric monoester or a phosphoric diester,
(d) a water scavenger constituent (D) comprising trialkyl orthoformate, wherein one or more constituents of the coating composition contain, between 2.5 to 97.5 mol %, based in each case on the sum of the functional groups critical for crosslinking in the coating composition, formed from the fractions of the hydroxyl and isocyanate groups and from fractions of at least one structural unit of the formula (II)

$$—N(X—SiR''_x(OR')_{3-x})_n(X'—SiR''_y(OR')_{3-y})_m \qquad (II)$$

where
R'=hydrogen, alkyl or cycloalkyl, the carbon chain being interrupted or not interrupted by nonadjacent oxygen, sulfur or NRa groups, with Ra=alkyl, cycloalkyl, aryl or aralkyl, X, X'=linear and/or branched alkylene or cycloalkylene radical having 1 to 20 carbon atoms,
R''=alkyl, cycloalkyl, aryl or aralkyl, the carbon chain being interrupted or not interrupted by nonadjacent oxygen, sulfur or NRa groups, with Ra=alkyl, cycloalkyl, aryl or aralkyl,
n=0 to 2, m=0 to 2, m+n=2, and
x and y=0 to 2,
and
at least one structural unit of the formula (III)

$$—Z—(X—SiR''_x(OR)_{3-x}) \qquad (III),$$

where
Z=—NH—, —NR—, —O—, with R=alkyl, cycloalkyl, aryl or aralkyl, the carbon chain being interrupted or not interrupted by nonadjacent oxygen, sulfur or NRa groups, with Ra=alkyl, cycloalkyl, aryl or aralkyl,
x=0 to 2, and
X, R', and R'' being as defined for formula (II).

* * * * *